US010769157B2

(12) United States Patent
Singh et al.

(10) Patent No.: US 10,769,157 B2
(45) Date of Patent: Sep. 8, 2020

(54) METHOD AND SYSTEM FOR MAPPING ATTRIBUTES OF ENTITIES

(71) Applicant: Tata Consultancy Services Limited, Mumbai (IN)

(72) Inventors: Karamjit Singh, Gurgaon (IN); Garima Gupta, Gurgaon (IN); Gautam Shroff, Gurgaon (IN); Puneet Agarwal, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 297 days.

(21) Appl. No.: 15/920,094

(22) Filed: Mar. 13, 2018

(65) Prior Publication Data

US 2018/0260396 A1    Sep. 13, 2018

(30) Foreign Application Priority Data

Mar. 9, 2017 (IN) .............................. 201721008321

(51) Int. Cl.
*G06F 16/24* (2019.01)
*G06F 16/2457* (2019.01)
*G06N 10/00* (2019.01)
*G06F 16/22* (2019.01)
(Continued)

(52) U.S. Cl.
CPC ...... *G06F 16/24578* (2019.01); *G06F 16/215* (2019.01); *G06F 16/2246* (2019.01); *G06N 7/005* (2013.01); *G06N 10/00* (2019.01)

(58) Field of Classification Search
CPC ........... G06F 16/24578; G06F 16/2246; G06F 16/215
See application file for complete search history.

(56) References Cited

U.S. PATENT DOCUMENTS

| 2014/0201126 A1* | 7/2014 | Zadeh | A61B 5/165 706/52 |
| 2016/0240097 A1* | 8/2016 | Bensley | G09B 19/0092 |

OTHER PUBLICATIONS

Jing, Y. et al. "Efficient discriminative learning of Bayesian network classifier via Boosted Augmented Naïve Bayes," *ICML '05 Proceedings of the 22nd International Conference on Machine Learning*, Bonn, Germany, Aug. 7-11, 2005; pp. 369-376.

(Continued)

*Primary Examiner* — Loc Tran
(74) *Attorney, Agent, or Firm* — Finnegan, Henderson, Farabow, Garrett & Dunner, LLP

(57) ABSTRACT

This disclosure relates generally to data processing, and more particularly to a system and a method for mapping heterogeneous data sources. For a product being sold globally, there might be one global database listing characteristics of the product, and from various System and method for mapping attributes of entities are disclosed. In an embodiment, the system uses a combination of Supervised Bayesian Model (SBM) and an Unsupervised Textual Similarity (UTS) model for data analysis. A weighted ensemble of the SBM and the UTS is used, wherein the ensemble is weighted based on a confidence measure. The system, by performing data processing, identifies data match between different data sources (a local databases and a corresponding global database) being compared, and based on matching data found, performs mapping between the local databases and the global database.

13 Claims, 2 Drawing Sheets

(51) Int. Cl.
    *G06F 16/215*    (2019.01)
    *G06N 7/00*    (2006.01)

(56) References Cited

OTHER PUBLICATIONS

Chebrolu, S. et al. (Jun. 2005). "Feature deduction and ensemble design of intrusion detection systems," *Computers & Security*, vol. 24, No. 4; pp. 295-307.

Linero, A. (2017). "A review of tree-based Bayesian methods," *Communications for Statistical Applications and Methods*, vol. 24; pp. 543-559 28 pages.

Han, L. et al. "UMBC_EBIQUITY-CORE: Semantic Textual Similarity Systems," *Second Joint Conference on Lexical and Computational Semantics*, Georgia, USA, Jun. 13-14, 2013; pp. 44-52.

Wang, H. "Mining Concept-Drifting Data Streams using Ensemble Classifiers," *KDD '03 Proceedings of the Ninth ACM SIGKDD International Conference on Knowledge Discovery and Data Mining*, Washington, DC, US, Aug. 24-27, 2003; pp. 226-235.

\* cited by examiner

METHOD AND SYSTEM FOR MAPPING ATTRIBUTES OF ENTITIES

PRIORITY CLAIM

This U.S. patent application claims priority under 35 U.S.C. § 119 to: India Application No. 201721008321, filed on Sep. 3, 2017. The entire contents of the aforementioned application are incorporated herein by reference.

TECHNICAL FIELD

This disclosure relates generally to data processing, and more particularly to a system and a method for mapping heterogeneous data sources.

BACKGROUND

In various applications, it is required to compare two or more data sources and identify similarity between contents in the data sources being compared. For example, consider that an organization has multiple branches spread across the globe. The organization may be maintaining a global database that has information pertaining to various products and services offered and/or managed by the organization. However, it is possible that when the organization collects data from each of its branches, the data is in heterogeneous format, which means each branch may be using data that is customized as per local standards and/or requirements that helps each branch effectively manage activities in that specific locality. That means the organization would end up collecting data in heterogeneous format.

The inventors here have recognized several technical problems with such conventional systems, as explained below. If the organization intends to collect data from different branches and analyze the data, analysis becomes a hurdle as the data is in heterogeneous format. Existing systems that facilitate heterogeneous data processing and analysis rely on textual similarity feature based techniques, which are unsupervised. The mechanism used being unsupervised, affects quality of outputs.

SUMMARY

Embodiments of the present disclosure present technological improvements as solutions to one or more of the above-mentioned technical problems recognized by the inventors in conventional systems. For example, in one embodiment, a processor implemented method for mapping heterogeneous databases is provided. Initially, at least one local database as input is received as input, via one or more hardware processors, by a data mapping system. Further, at least one characteristic and at least one description corresponding to each of a plurality of product entries in the local database are extracted, via the one or more hardware processors, by the data mapping system. Further, by virtue of an automated mapping, contents of the at least one local database and corresponding global database are mapped, wherein the automated mapping involves the following steps:

A first set of probability distribution and confidence value are generated by applying a Supervised Bayesian Model (SBM) on the at least one characteristic of each of the plurality of product entries in the local database and product data from the corresponding global database. Further, a second set of probability distribution and confidence value are generated by applying an Unsupervised Textual Similarity (UTS) model on the at least one description of each of the plurality of product entries in the local database and the product data from the corresponding global database. A weighted confidence score and probability distribution are generated based on the first set of probability distribution and confidence value and the second set of probability distribution and confidence value, wherein the weighted confidence score and probability distribution indicate extent of similarity between the plurality of product entries in the local database and the product data from the corresponding global database. Further, the local database and the global database are mapped based on the first set of probability distribution and confidence value, the second set of probability distribution and confidence value, and the weighted confidence score and probability distribution, via the one or more hardware processors, by the data mapping system, wherein data from the local database are mapped to corresponding data in the global database.

In another embodiment, a data mapping system is provided. The data mapping system includes at least one hardware processor; and a memory module storing a plurality of instructions. The plurality of instructions, when executed, cause the hardware processor to receive at least one local database as input, using an Input/Output (I/O) interface of the data mapping system. A mapping module of the data mapping system then extracts at least one characteristic and at least one description corresponding to each of a plurality of product entries in the local database. The mapping module then performs an automated mapping between the local database and a corresponding global database, wherein the automated mapping further involves the following steps:

A first set of probability distribution and confidence value are generated by applying a Supervised Bayesian Model (SBM) on the at least one characteristic of each of the plurality of product entries in the local database and data from corresponding global database. Further, a second set of probability distribution and confidence value are generated by applying an Unsupervised Textual Similarity (UTS) model on the at least one description of each of the plurality of product entries in the local database and product data from corresponding global database. A weighted confidence score and probability distribution are generated based on the first set of probability distribution and confidence value and the second set of probability distribution and confidence value, wherein the weighted confidence score and probability distribution indicate extent of similarity between the plurality of product entries in the local database and product data in the corresponding global database. Further, the local database and the global database are mapped based on the first set of probability distribution and confidence value, the second set of probability distribution and confidence value, and the weighted confidence score and probability distribution, via the one or more hardware processors, by the data mapping system, wherein data from the local database are mapped to corresponding data in the global database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
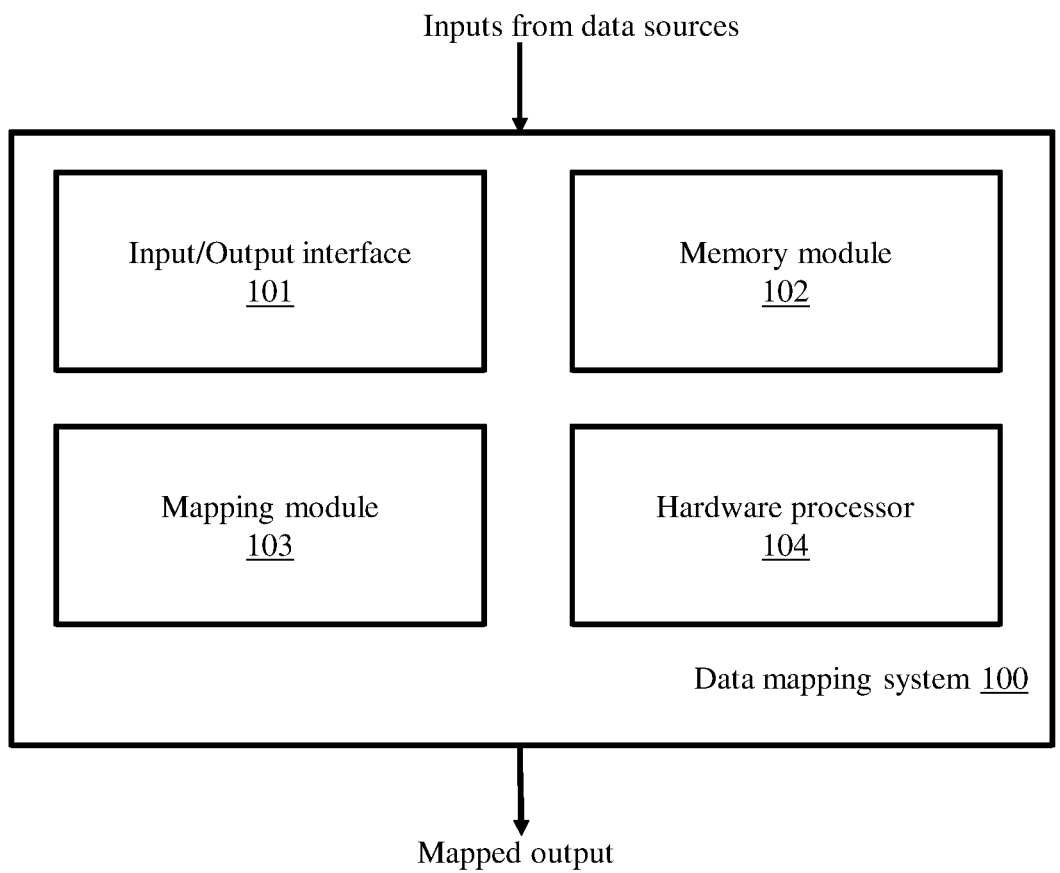
FIG. 1 illustrates an exemplary block diagram of a data mapping system that performs the data processing, according to some embodiments of the present disclosure.

FIG. 1 is a block diagram of a data mapping system that performs the data processing, according to some embodiments of the present disclosure. The data mapping system includes an Input/Output (I/O) interface 101, a memory module 102, a mapping module 103, and a hardware processor 104. In an embodiment, the components/terminologies as well as the number of each component of the data mapping system 100, as depicted in FIG. 1, are for illustration purpose only, and can vary as per implementation requirements/standards.

The Input/Output (I/O) interface 101 is configured provide at least a channel for facilitating communication between the data mapping system 100 and at least one external entity. The external entity can be a user and/or a system. For example, the I/O interface 101 can provide a suitable interface for a user to directly interact with the data mapping system 100 so as to provide input and/or to access output and/or to perform one or more action(s) related to the data processing being carried out by the data mapping system 100. In another example, the I/O interface 101 can be configured to provide at least one channel with suitable communication protocol(s) to facilitate communication components of the data mapping system 100. The I/O module 101, by interacting with the at least one external entity, collects a data sources that are to be processed further, as input. The data sources include at least one global data source and at least one local data source that need to be compared and mapped, during the data processing. In an embodiment, the input is of heterogeneous nature. In an embodiment, the data sources (i.e. the global and local data sources) do not share a common key, which means the data in the data sources are heterogeneous.

The memory module 102 is configured to store any type of data associated with the data processing being handled by the data mapping system 100. For example, the data sources collected as input for processing are stored in appropriate database(s) in the memory module 102. The data may be stored permanently and/or temporarily, as configured. The memory module 102 further stores result of data processing, which can be provided as output to a user, instantly and/or as and when required. The memory module 102 is further configured to provide access to all or selected contents stored, for a user, with or without performing an authentication check.

The mapping module 103 is configured to collect local and global data bases from the memory module 102, and perform data processing to identify related contents in the databases being analyzed. In an embodiment, the data in the data sources being analyzed are of heterogeneous nature. For example, the global data source stores standard terminology and/or definition for a particular entity, wherein the 'entity' being referred to in this context maybe a product and/or process. A local data source being analyzed has a different terminology used for the same entity, along with a definition. The mapping module 103, by performing the data processing, identifies relationship between similar data in the local and global data sources, and accordingly performs mapping between the related data as identified during the data processing. The mapping module 103, to map the global and local databases, can perform an automated mapping and/or a verified mapping. In an embodiment, for any given input, the mapping module 103 performs the automated mapping by combining a supervised Bayesian model and an unsupervised textual similarity model. Along with mapping results obtained using the automated mapping, the mapping module 103 also generates a confidence score for the relation/mapping identified using the automated mapping process. The confidence score represents extent of accuracy with respect to mapping done between the local and global databases. The confidence score thus generated is further used by the mapping module 103 to determine whether user intervention/supervision is required in the data mapping process or not. For example, if the confidence score is less than a pre-defined threshold value, this would indicate that the accuracy in mapping done between the global and local databases is low, and the mapping module 103 can then allow/prompt a user to intervene and monitor the mapping process (i.e., verified mapping). The mapping module 103 can be further configured to perform fusion of the databases being mapped, based on one or more matching data found.

The supervise Bayesian model and the Unsupervised Text Similarity (UTS) being used by the mapping module 103, for the automated mapping, are explained below (For example purpose, the Bayesian and UTS models are explained by considering global and local data sources having information related to characteristics such as but not limited to flavor, and brand, of one or more products):

Consider two databases:
a. Local database (DB(L)) with each product I having local characteristics L1, L2, . . . LM, and retailer descriptions (DI), and
b. a Global database (DB (G)) having K global characteristics.

Record matching is to be performed where products in local database are to be mapped to global characteristic values (for example, 'category', or 'global brand' and so on).

From the data-mining point of view, each product I in L has two kind of information (1) 'M' Local characteristics and (2) Textual descriptions by retailers. By using combination of Bayesian model and UTS, value of global characteristic $G_j$ is predicted for each product in L. In the data processing stage, (1) Supervised Bayesian Model (SBM) using local characteristics; and
(2) Unsupervised Textual Similarity (UTS) using descriptions Both the SBM and UTS are used to compute probability of every possible state $g_{j,t}$, $t=1, 2, \ldots m_j$ of $G_j$. Separate probability values are generated using the SBM and UTS approaches, and further, a weighted ensemble based approach is used to combine the probabilities of both models to predict the value of Gj.

Supervised Bayesian Model:
Approach to build SBM comprises of 3 steps:
(1) Network Structure Learning,
(2) Parameter Learning,
(3) Bayesian Inference.

A learning Tree based Bayesian Networks (TBN) is used for structure learning, whereas for parameter learning and Bayesian inference, a probabilistic query based approach on the databases of conditional probability is used.

TBN Structure Learning:

Bayesian networks are associated with parameters known as conditional probability tables (CPT), where a CPT of a node indicates the probability that each value of a node can take given all combinations of values of its parent nodes. In CPTs, the number of bins grows exponentially as the number of parent nodes increases leaving fewer data instances in each bin for estimating the parameters. Thus, sparser structures often provide better estimation of the underlying distribution. Also, if the number of states of each node becomes high and the learned model is complex, Bayesian inferencing becomes conceptually and computationally intractable. Hence, tree-based structures are useful for density estimation from limited data and in the presence of higher number of states for facilitating faster inferencing. A greedy search may be used for this purpose, and score based approach is used for learning TBN structure.

Given the global characteristic $G_j$ and M local characteristics, a set of top $\eta$ most relevant local characteristics with respect to $G_j$ using mutual information.

These $\eta$ local characteristics by the set $Y^j$ (L). Further, a Tree based Bayesian Network (TBN) on random variables $X = \{X_r: r=1, 2, \ldots \eta+1\}$ where each $X_r \in X$ is either a local characteristic $L_i \in Y^j$ (L) or global characteristic $G_j$.

Cross-entropy between the tree structures distributions and the actual underlying distribution is minimized when the structure is a maximum weight spanning tree (MST). As a result, in order to learn TBN structure, MST is learnt for the characteristics in the set X. Mutual information between each pair characteristics, denoted by W (Xr;Xs). Further, mutual information is obtained as the weight between each pair of characteristics and learn MST using Kruskal's algorithm.

$$TotalWeight(TW) = \sum_{r=1, P_a(X_r) \neq 0}^{\eta+1} W(X_r, P_a(X_r)) \quad (1)$$

By learning MST, order of search space of possible graphs is reduced. Using this MST, the mapping module 103 searches for directed graph with least cross-entropy, by flipping each edge directions sequentially to obtain $2^\eta$ directed graphs along with their corresponding TotalWeight (TW) calculated using Equation 1. Graph with maximum TW (minimum cross-entropy) is chosen as the best graphical structure representative of underlying distribution.

Parameter Learning and Interference

To learn the parameters (CPTs) of the Bayesian Network, for every product I in L probabilities $p_{j,1}^l, p_{j,2}^l, \ldots p_{j,m_j}^l$, for every state of $G_j$, given the observed values of local characteristics in the Bayesian network.

By applying the supervised Bayesian Model on the characteristics extracted from the contents of the local database, the mapping module 103 generates a first set of confidence value and probability distribution.

Unsupervised Text Similarity

UTS approach is used to compute the probability $q_{j,1}^l, q_{j,2}^l, \ldots q_{j,m_j}^l$ of each possible state of the global characteristic Gj using retailer descriptions. Consider each product I in L has rl descriptions and for each description $d_{l,r}$, where $r=1, 2, \ldots$ rl n-grams of adjacent words are determined. Let $N_l = \{n_v^l, v=1,2,\ldots\}$ be the set of n-grams of all descriptions, where $f_v^l$ be the frequency of each $n_v^l$ defined as a ratio of the number of descriptions in which $n_v^l$ exists to the $r_l$.

For every state $g_{j,t}$ of $G_j$, best matching n-gram from the set $N_l$ is determined by calculating Jaro-Wrinkler distance between $g_{j,t}$ and every $n_v^l \in N_l$ and choose the n-gram, say $n_{v,t}^l$ with the maximum score $s_{j,t}^l$ to get new score $s_{j,t}^l = s_{j,t}^l * f_{l,t}^s$. Finally, each score $s_{j,t}^l$ is converted into the probability $q_{j,t}^l$ by using softmax scaling function.

By applying the UTS model on the descriptions extracted from the contents of the local database, the mapping module 103 generates a second set of confidence value and probability distribution.

Ensemble of Models

Based on confidence value of both predictions (SBM and UTS), and for a given probability distribution $\{P_{j,t}^l: t=1, 2, \ldots m_j\}$ for values of $G_j$ using SBM model, confidence corresponding to each probability is determined as:

$$C(p_{j,t}^l) = 1 - \sqrt{\Sigma_{t=1}^{m_j}(p_{j,t}^l - h_{t'}^l(t))^2} \quad (2)$$

where
$t = 1, 2, \ldots m_j$
$h_{t'}^l(t)$ is ideal distribution, which is 1 when t=t' and 0 otherwise. Similarly for each probability $q_{j,t}^l$, confidence C $(q_{j,t}^l)$ is determined.

With the given probability distribution and the confidence values from both models, weighted linear sum of two probabilities is taken to get the new probability distribution over the states of Gj: $P_{j,t}^l = C (P_{j,t}^l) * P_{j,t}^l + C (q_{j,t}^l) * q_{j,t}^l$, $t=1, 2, \ldots mj$, and value of Gj is chosen for maximum $P_{j,t}^l$. The ensemble referred to here is a confidence based weighted ensemble i.e. the ensemble is weighted based on confidence measure.

Further, the confidence value is compared with a threshold value of confidence value, wherein the threshold value of confidence value is pre-defined and configured with the data mapping system 100. If the confidence value is less than the threshold value, then the data mapping system 100 prompts a user to intervene and verify the mapping. If the confidence score is found to exceed the threshold value, then the mapping module 103 continues with the automated mapping process using the SBM and the UST models. The mapping module 103 can be further configured to perform fusion of the data sources based on mapping results.

The hardware processor 104, (or a plurality of hardware processors) is configured to communicate with other components of the data mapping system 100, and perform one or more actions/steps as indicated by the corresponding component, by receiving appropriate data and/or control signals from the corresponding component.

Figure 2:
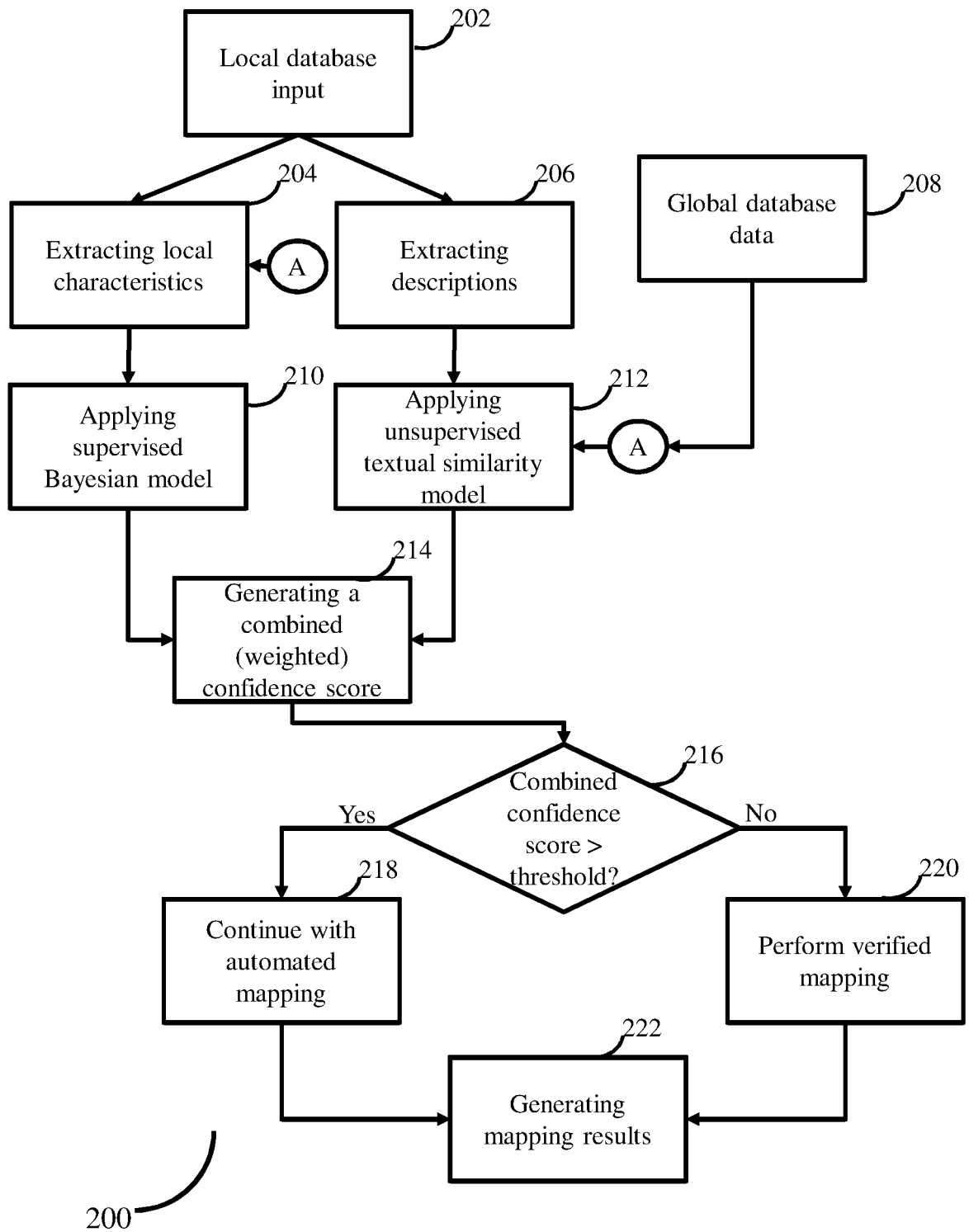
FIG. 2 is a flow diagram that depicts steps involved in the process of performing data processing using the data mapping system, according to some embodiments of the present disclosure.

FIG. 2 is a flow diagram 200 that depicts steps involved in the process of performing data processing using the data mapping system, in accordance with some embodiments of the present disclosure. Consider any product 'A' that is being sold globally. The same product may be named differently over different parts of the world. Also, description provided to the same product by different vendors/sellers across different parts of the globe also can vary. Assume that there is a 'global database' which stores data such as but not limited to different characteristics and actual descriptions of at least 'A' is stored. For the same product, there may be a plurality of 'local databases' in which local characteristics and descriptions given for 'A' at different parts of the world are stored. As the databases i.e. the global database and the one or more local databases are heterogeneous (i.e. there is no common key between the global and local databases), the data mapping system 100 uses the data processing described herein to perform data mapping between the global and local databases.

For explanation purpose, assume that 'one' local database is given (202) as input to the data mapping system 100. The data mapping system 100 extracts (204) local characteristics of one or more products listed in the local database. The data mapping system 100 further extracts (206) descriptions of the one or more products listed in the local database. The data mapping system 100 also collects the global database (208) corresponding to the local database as input. The data mapping system 100 then applies (210) a Supervised Bayesian Model (SBM) on the extracted local characteristics and data from the global database, and generates a first set of probability distribution and a confidence value. Similarly, the data mapping system 100 applies (212) an Unsupervised Textual Similarity (UTS) on the descriptions extracted from the local database as well as on the data from the global database, and generates a second set of probability distribution and a confidence value.

The data mapping system 100 then processes the first set of probability distribution and the confidence value and the second set of probability distribution and the confidence value (an ensemble of the first and second set) to generate a combined confidence score. The combined confidence score represents extent of similarity between the data in the local database and that in the global database. The data mapping system 100 then compares (216) the combined confidence score with a threshold score (referred to as 'threshold value'). The combined confidence score exceeding the threshold value indicates higher accuracy in mapping, and in that case, the data mapping system 100 continues with (218) the automated mapping as explained in the aforementioned steps. The combined confidence score being less than the threshold value indicates that the accuracy of the automated mapping performed by the data mapping system 100 is less, and in that case, the data mapping system 100 performs (220) a verified mapping, wherein a user intervention maybe prompted during the mapping process. By performing one of the automated mapping and/or the verified mapping, the data mapping system 100 generates (222) mapping results. In an embodiment, after performing mapping between the local and global databases, the data mapping system 100 can be used to fuse the global and local databases. In an embodiment, the data mapping system 100 takes into consideration, a weighted ensemble of probability distribution from the SBM and UST models, as an input for fusion of the local and global databases.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for mapping heterogeneous databases, comprising:
    receiving at least one local database as input, via one or more hardware processors, by a data mapping system;
    extracting at least one characteristic and at least one description corresponding to each of a plurality of product entries in the local database, via the one or more hardware processors, by the data mapping system; and
    performing mapping between the local database and a corresponding global database, by performing an automated mapping, by the data mapping system, wherein the automated mapping comprises of:
        generating a first set of probability distribution and confidence value by applying a Supervised Bayesian Model on the at least one characteristic of each of the plurality of product entries in the local database and product data from the corresponding global database;
        generating a second set of probability distribution and confidence value by applying an Unsupervised Textual Similarity model on the at least one description of each of the plurality of product entries in the local database and the product data from the corresponding global database;
        generating a weighted confidence score and a probability distribution based on the first set of probability distribution and confidence value and the second set of probability distribution and confidence value, wherein the weighted confidence score and probability distribution indicate extent of similarity between the plurality of product entries in the local database and that in the corresponding global database; and
        mapping the local database and the corresponding global database based on the first set of probability distribution and confidence value, the second set of probability distribution and confidence value, and the weighted confidence score and the probability distribution, wherein all products from the local database are mapped to corresponding product data in the global database.

2. The method of claim 1, wherein generating the first set of probability distribution comprises of:
selecting a certain number of most relevant local characteristics for each global characteristic in the global database;
generating a maximum Weight Spanning Tree for each global characteristic and corresponding local characteristics selected, wherein mutual information between the global and the local characteristics is used as edge weight of the maximum Weight Spanning Tree;
learning a plurality of Conditional Probability Tables for data in the maximum Weight Spanning Tree; and
computing probability value for each state of each global characteristic Gj in the global database, with respect to value of the most relevant local characteristics selected, as a probability value belonging to the first set of probability distribution, based on one or more dependencies indicated in the plurality of Conditional Probability Tables.

3. The method of claim 1, wherein generating the second probability distribution comprises of:
concatenating all retailer descriptions provided for each product in the local database;
forming n-gram of all the concatenated descriptions to form a set NI comprising the n-gram of all the concatenated descriptions;
calculating a score that represents similarity between values from the set NI and global characteristic Gj, for a combination of each element of the set NI and corresponding state of global characteristic Gj, to generate a set of scores;
selecting an element having maximum score from the set of scores;
identifying frequency of each element of the set NI, defined as the ratio of number of descriptions in which element exists;
obtaining the calculated scores for all states of global characteristic Gj along with corresponding frequency; and
computing probability distribution of each product across all the states of global characteristic Gj, as the second probability distribution.

4. The method of claim 1, wherein performing a verified mapping between the local database and the global database, based on the weighted confidence score comprises of:
comparing the weighted confidence score with a threshold score; and
selecting and performing the verified mapping if the generated confidence score is less than the threshold score.

5. The method of claim 1, wherein the global database and the at least one local database are heterogeneous databases having no common key.

6. A data mapping system, comprising:
at least one hardware processor; and
a memory module storing a plurality of instructions, said plurality of instructions, when executed, cause the hardware processor to:
receive at least one local database as input, using an Input/Output interface of the data mapping system;
extract at least one characteristic and at least one description corresponding to each of a plurality of product entries in the local database, using a mapping module of the data mapping system; and
perform an automated mapping between the local database and a corresponding global database, by using the mapping module, wherein the automated mapping comprises of:
generating a first set of probability distribution and confidence value by applying a Supervised Bayesian Model on the at least one characteristic of each of the plurality of product entries in the local database and product data from the corresponding global database;
generating a second set of probability distribution and confidence value by applying an Unsupervised Textual Similarity model on the at least one description of each of the plurality of product entries in the local database and the product data from the corresponding global database;
generating a weighted confidence score and a probability distribution based on the first set of probability distribution and confidence value and the second set of probability distribution and confidence value, wherein the weighted confidence score and probability distribution indicate extent of similarity between the plurality of product entries in the local database and that in the global database; and
mapping the local database and the corresponding global database based on the first set of probability distribution and confidence value, the second set of probability distribution and confidence value, and the weighted confidence score and the probability distribution, wherein all products from the local database are mapped to corresponding product data in the global database.

7. The data mapping system of claim 6, wherein the mapping module-generates the first set of probability distribution by:
selecting a certain number of most relevant local characteristics for each global characteristic in the global database;
generating a maximum Weight Spanning Tree for a global characteristic and corresponding local characteristics selected, wherein mutual information between the global and the local characteristic is used as edge weight of the maximum Weight Spanning Tree;
learning a plurality of Conditional Probability Tables for data in the maximum Weight Spanning Tree; and
computing probability value for each state of each global characteristic Gj in the global database, with respect to value of the most relevant local characteristics selected, as a probability value belonging to the first set of probability distribution, based on one or more dependencies indicated in the plurality of Conditional Probability Tables.

8. The data mapping system of claim 6, wherein the mapping module-generates the second set of probability distribution by:
concatenating all retailer descriptions provided for each product in the local database;
forming n-gram of all the concatenated descriptions to form a set NI comprising the n-gram of all the concatenated descriptions;
calculating a score that represents similarity between values from the set NI and global characteristic Gj, for a combination of each element of the set NI and corresponding state of global characteristic Gj, to generate a set of scores;

selecting an element having maximum score from the set of scores;

identifying frequency of each element of the set NI, defined as the ratio of number of descriptions in which element exists;

obtaining the calculated scores for all states of global characteristic Gj along with corresponding frequency; and computing probability distribution of each product across all the states of global characteristic Gj, as the second probability distribution.

9. The data mapping system of claim 6, wherein the mapping module performs a verified mapping between the local database and the global database, by:

comparing the weighted confidence score with a threshold score; and selecting and performing the verified mapping if the generated confidence score is less than the threshold score.

10. One or more non-transitory machine readable information storage mediums comprising one or more instructions which when
executed by one or more hardware processors causes:
receiving at least one local database as input, via one or more hardware processors;
extracting at least one characteristic and at least one description corresponding to each of a plurality of product entries in the local database, via the one or more hardware processors; and
performing mapping between the local database and a corresponding global database, by performing an automated mapping, wherein the automated mapping comprises of:
generating a first set of probability distribution and confidence value by applying a Supervised Bayesian Model on the at least one characteristic of each of the plurality of product entries in the local database and product data from the corresponding global database;
generating a second set of probability distribution and confidence value by applying an Unsupervised Textual Similarity model on the at least one description of each of the plurality of product entries in the local database and the product data from the corresponding global database;
generating a weighted confidence score and a probability distribution based on the first set of probability distribution and confidence value and the second set of probability distribution and confidence value, wherein the weighted confidence score and probability distribution indicate extent of similarity between the plurality of product entries in the local database and that in the corresponding global database; and
mapping the local database and the corresponding global database based on the first set of probability distribution and confidence value, the second set of probability distribution and confidence value, and the weighted confidence score and the probability distribution, wherein all products from the local database are mapped to corresponding product data in the global database.

11. The one or more non-transitory machine readable information storage mediums of claim 10, wherein the one or more instructions which when executed by the one or more hardware processors, for generating the first set of probability distribution, cause:

selecting a certain number of most relevant local characteristics for each global characteristic in the global database;

generating a maximum Weight Spanning Tree for a global characteristic and corresponding local characteristics selected, wherein mutual information between the global and the local characteristic is used as edge weight of the maximum Weight Spanning Tree;

learning a plurality of Conditional Probability Tables for data in the maximum Weight Spanning Tree; and computing probability value for each state of each global characteristic Gj in the global database, with respect to value of the most relevant local characteristics selected, as a probability value belonging to the first set of probability distribution, based on one or more dependencies indicated in the plurality of Conditional Probability Tables.

12. The one or more non-transitory machine readable information storage mediums of claim 10, wherein the one or more instructions which when executed by the one or more hardware processors, for generating the second set of probability distribution, cause:

concatenating all retailer descriptions provided for each product in the local database;

forming n-gram of all the concatenated descriptions to form a set NI comprising the n-gram of all the concatenated descriptions;

calculating a score that represents similarity between values from the set NI and global characteristic Gj, for a combination of each element of the set NI and corresponding state of global characteristic Gj, to generate a set of scores;

selecting element having maximum score, from the set of scores;

identifying frequency of each element of the set NI, defined as the ratio of number of descriptions in which element exists;

obtaining the calculated scores for all states of global characteristic Gj along with corresponding frequency; and computing probability distribution of each product across all the states of global characteristic Gj, as the second probability distribution.

13. The one or more non-transitory machine readable information storage mediums of claim 10, wherein the one or more instructions which when executed by the one or more hardware processors, for performing a verified mapping between the local database and the global database, cause:

comparing the weighted confidence score with a threshold score; and selecting and performing the verified mapping if the generated confidence score is less than the threshold score.

* * * * *